United States Patent
Lundström (10) Patent No.: US 9,231,925 B1
(45) Date of Patent: Jan. 5, 2016

(54) NETWORK AUTHENTICATION METHOD FOR SECURE ELECTRONIC TRANSACTIONS

(71) Applicant: Keypasco AB, Gothenburg (SE)

(72) Inventor: Magnus Lundström, Gothenburg (SE)

(73) Assignee: KEYPASCO AB, Gothenburg (SE)

( * ) Notice: Subject to any disclaimer, the term of this patent is extended or adjusted under 35 U.S.C. 154(b) by 0 days.

(21) Appl. No.: 14/488,255

(22) Filed: Sep. 16, 2014

(51) Int. Cl.
*H04L 29/06* (2006.01)
*H04L 9/30* (2006.01)

(52) U.S. Cl.
CPC ............ *H04L 63/0428* (2013.01); *H04L 9/30* (2013.01)

(58) Field of Classification Search
CPC .................................................. H04L 63/0428
USPC ....................................................... 713/168
See application file for complete search history.

(56) References Cited

U.S. PATENT DOCUMENTS

2015/0134962 A1* 5/2015 Mahajan ............. H04L 63/0428
713/171

* cited by examiner

*Primary Examiner* — Longbit Chai
(74) *Attorney, Agent, or Firm* — Hamre, Schuman, Mueller & Larson, P.C.

(57) ABSTRACT

In a network authentication method, a client device stores a certificate reference mapped uniquely to a certificate, which is assigned to an end user, and a reference private key obtained by encrypting a private key with a PIN code determined by the end user. The client device generates a digital signature for transaction data associated with the certification reference using a current key that is obtained by decrypting the reference private key with a user input code obtained through an input operation. A verification server verifies, based on a public key of a stored certificate, whether a received digital signature is signed with the private key, and obtains from the digital signature the transaction data when verification result is affirmative.

11 Claims, 6 Drawing Sheets

NETWORK AUTHENTICATION METHOD FOR SECURE ELECTRONIC TRANSACTIONS

FIELD OF THE INVENTION

The invention relates to network transaction authentication, and mere particularly to a network authentication method for secure electronic transactions.

BACKGROUND OF THE INVENTION

Online web-based services are widely used today, typical examples being online banking services and online shopping services. However, problems associated with transaction security have posed serious challenges and risks to institutions and their customers. In a global economy with billions of transactions carried daily over insecure public internet Protocol (IP) networks, identity and/or personal information protection becomes paramount. In general, a customer computer environment is considered to be insecure due to its vulnerability to a variety of malicious software, such as keystroke recorder, Trojan horse, or even screen recorder, etc., that are able to record keystrokes, redirect critical messages to a fake server, or effectively "video record" a computer screen. Through a variety of means, hackers are able to steal customer identities and/or personal information. Even worse, critical data may be modified.

The traditional way to authenticate a customer is for a client computer to provide a user-id and a password. However, this one-factor (e.g., the combination of a user-id and a password) authentication is not secure enough to protect either the customer or the institution from attacks by malicious software or malware (including Trojan horses) using approaches, such as man-in-the-middle (MITM), man-in-the-browser (MITB), and keystroke logging.

Since the user-id and the password may be stolen, an identity verification device, e.g., a universal serial bus (USB) device loaded with a public key infrastructure (PKI) certificate, an integrated circuit (IC) electronic card or a dynamic token, may additionally be used for verifying the identity of the customer, thereby making the cost of customer service for personalization, distribution and troubleshooting considerable. Further, the necessity of having different identity verification devices for different institutions proves to be quite inconvenient for customers.

Therefore, there is still room for improvement in the above techniques.

SUMMARY OF THE INVENTION

Therefore, an object of the present invention is to provide a network authentication for secure electronic transactions that can overcome the aforesaid drawbacks.

According to the present invention, there is provided a network authentication method to be implemented using a client device and a verification server that are connected to a communication network. The client device is associated with an end user and stores an authentication application. The network authentication method of the present invention comprises the steps of:

a) storing, by the verification server, a certificate that is assigned to the end user, the certificate including a unique user identifier (UID) of the end user, and an asymmetric key pair of a public key and a private key;

b) storing, by the client device, a certificate reference that is mapped uniquely to the certificate assigned to the end user, and a reference private key that is obtained by encrypting the private key with a personal identification number (PIN) code, which is determined by the end user;

c) by the client device, after receipt of transaction data that is associated with an electronic transaction between the client device and a network server and that is to be confirmed by the end user, in response to execution of the authentication application, generating a user input code through an input operation, decrypting the reference private key stored in step b) with the user input code to obtain a current key, and generating a digital signature for the transaction data using the current key and the transaction data; and d) by the verification server, upon receipt of a digital signature and a certificate reference via the communication network, determining, based on the public key of the certificate to which the certificate reference received thereby is uniquely mapped, whether or not the digital signature is signed with the private key, and obtaining from the digital signature the transaction data that is associated with the end user and that has been confirmed by the end user when it is determined that the digital signature is signed with the private key.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
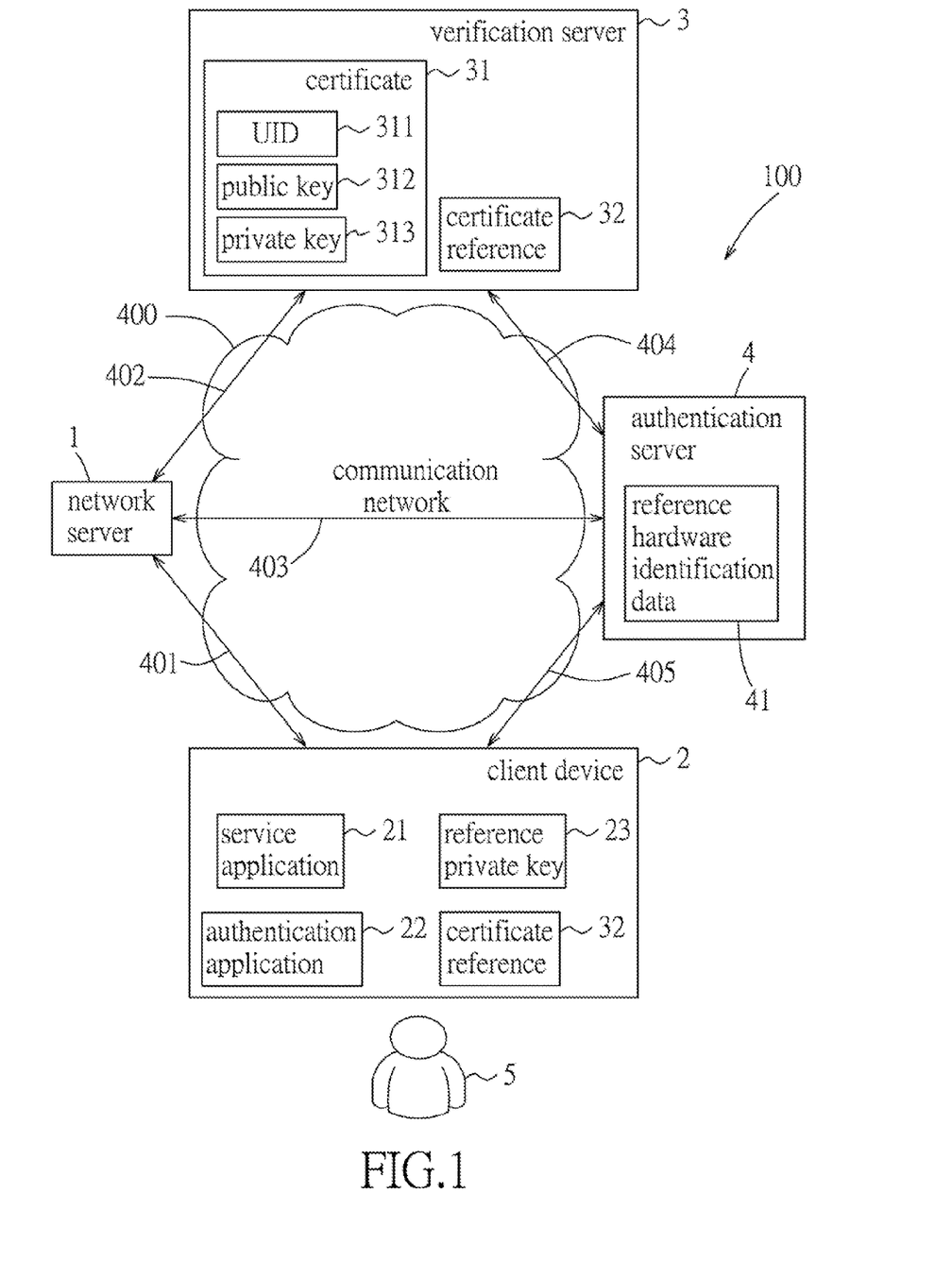
FIG. 1 is a schematic block diagram illustrating a system that is configured for implementing a network authentication method according to the embodiment of the present invention.

Referring to FIG. 1, a system 100 is used to implement a network authentication method for secure electronic transactions according to the embodiment of the present invention. The system 100 includes a network server 1 (e.g., an Internet content provider or ICP), a client device 2, a verification server 3 (e.g., a certificate authority or CA) and an authentication server 4 that are connected to a communication network 400, such as the Internet. Particularly, the network server 1 communicates with the client device 2 via a first communication channel 401 in the communication network 400, with the verification server 3 via a second communication channel 402 in the communication network 400, and with the authentication server 4 via a third communication channel 403 in the communication network 400. The verification server 3 communicates with the authentication server 4 via a fourth communication channel 404 in the communication network 400. The client device 2 communicates with the authentication server 4 via a fifth communication channel 405 in the communication network 400. The first, second, third, fourth and fifth communication channels 401-405 are different from one another. Accordingly, it is relatively difficult to attack the first to fifth communication channels 401~405 simultaneously for stealing information associated with an end user 5.

For exemplary purposes, the network 1 may be, but is not limited to, a web bank server. The verification server 3 includes a database unit (not shown) for storing therein a certificate 31 that is to be assigned to the end user 5, and a certificate reference 32 that is mapped uniquely to the certificate 31. The certificate 31 includes a unique user identifier (UID) 311 of the end user 5, and an asymmetric key pair of a public key 312 and a private key 313. It is noted that, in this embodiment, the verification server 3 is able to issue certificates to users, and is further regarded as a trusted third party appointed by the authentication server 4 and the network server 1 to perform verification for signature and data.

The client device 2 is used by the end user 5, and may be an electronic device capable of Internet browsing or data communication, such as a personal computer, a notebook computer, a smart phone, a tablet computer, etc. The client device 2 includes a plurality of hardware components (not shown), such as a central processing unit, a basic input/output system (BIOS) unit, a storage unit, a network interface unit, a motherboard, etc., each of which has a unique identification code (not shown). The storage unit of the client device 2 stores a service application 21 associated with the network server 1, an authentication application 22 associated with network authentication, the certificate reference 32, and a reference private key 23 obtained by encrypting the private key 313 with a personal identification number (PIN) code that is determined by the end user 5. The authentication server 4 stores reference hardware identification data 41 that is associated with the UID 311 of the end user 5 and that is used to verify the identity of the client device 2.

Figure 2A:
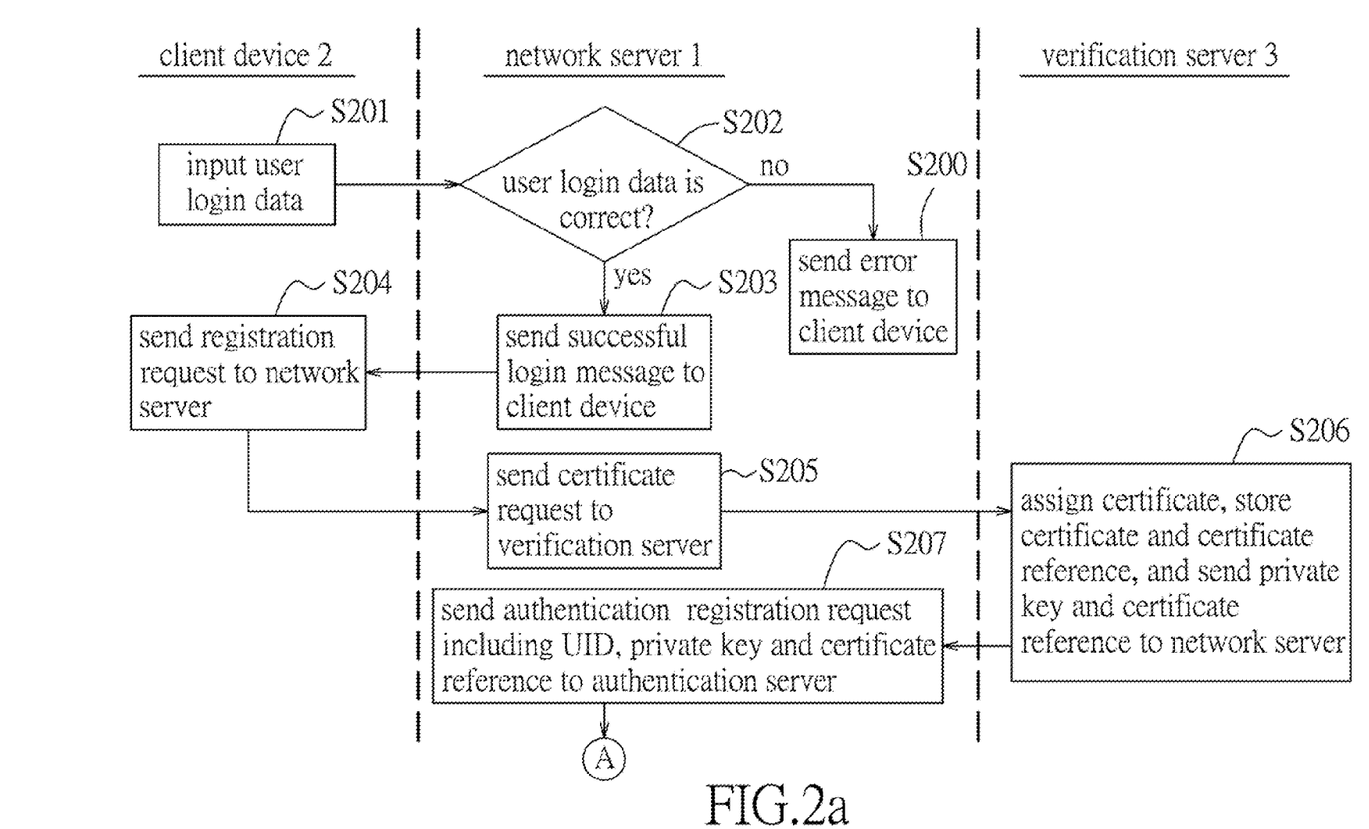
FIGS. 2a and 2b cooperatively illustrate a registration procedure of the network authentication method of the embodiment.
Figure 2B:
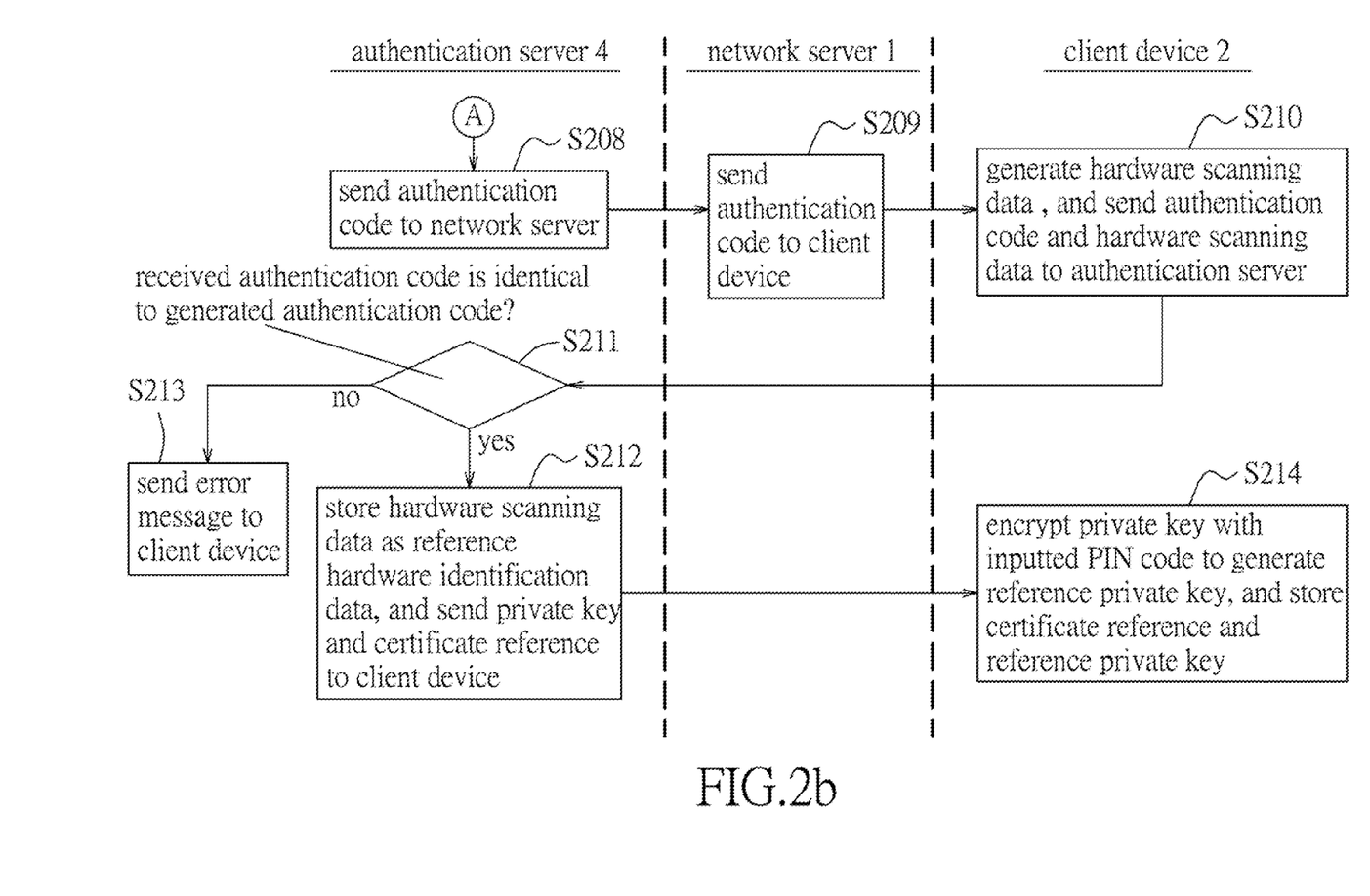

Referring to FIGS. 1, 2a and 2b, the system 100 implements a registration procedure of the network authentication method according to the embodiment of the present invention. The registration procedure of the network authentication method illustrates how the certification reference 32 and the reference private key 23 are stored in the client device 2 and how the reference hardware identification data 41 is stored in the authentication server 4, and includes the following steps.

In step S201, upon execution of the service application 21 on the client device 2, the end user 5 inputs user login data using a user input interface (not shown) of the client device 2 at a website provided by the network server 1. The user login data is then sent from the client device 2 to the network server 1 via the first communication channel 401. In this embodiment, the user login data includes a user identification serving as the UID 311, and a password.

In step S202, upon receipt of the user login data from the client device 2, the network server 1 determines whether the user login data is correct. If the result is affirmative, the network server 1 sends a successful login message to the client device 2 via the first communication channel 401 (step S203). Otherwise, the network server 1 sends an error message to the client device 2 for displaying on a display unit (not shown) of the client device 2 (step S200).

In step S204, upon receipt of the successful login message from the network server 1, the client device 2 sends, through the executed service application 21, a registration request for the end user 5 to the network server 1 via the first communication channel 401.

In step S205, in response to receipt of the registration request from the client device 2, the network server 1 sends a certificate request for the end user 5 to the verification server 3 via the second communication channel 402. The registration request includes the UID 311 of the end user 5.

In step S206, in response to receipt of the certificate request from the network server 3, the verification server 3 assigns the certificate 31 to the end user 5, and generates the certificate reference 32 that is mapped uniquely to the certificate 31. The verification server 3 stores the certificate 31 and the certificate reference 32 in the database unit, and sends the private key 313 and the certificate reference 32 to the network server 1 via the second communication channel 402.

In step S207, upon receipt of the private key 313 and the certificate reference 32 from the verification server 3, the network server 1 sends an authentication registration request for the end user 5 to the authentication server 4 via the third communication channel 403. The authentication registration request includes the UID 311 of the end user 5, the private key 313 and the certificate reference 32.

In step S208, in response to receipt of the authentication registration request from the network server 1, the authentication server 4 generates an authentication code (e.g., a one-time code), and sends the authentication code to the network server 1 via the third communication channel 403.

In step S209, upon receipt of the authentication code from the authentication server 4, the network sever 1 sends the authentication code to the client device 2 via the first communication channel 401.

In step S210, in response to receipt of the authentication code from the network server 4, the client device 2 executes the authentication application 22 to generate hardware scanning data that is associated with the identification codes of the hardware components of the client device 2 and to send the authentication code received thereby and the hardware scanning data generated thereby to the authentication server 4 via the fifth communication channel 405.

In step S211, upon receipt of the hardware scanning data and the authentication code from the client device 2, the authentication server 4 verifies whether the authentication code received thereby matches the authentication code generated in step S208. If the result is affirmative, the authentication server 4 stores the hardware scanning data as the reference hardware identification data 41, and sends via the fifth communication channel 405 to the client device 2 the private key 313 and the certificate reference 32 that are received thereby in the beginning of step S208 (step S212). Otherwise, the authentication server 4 sends an error message to the client device 2 for displaying on the display unit of the client device 2 (step S213).

Following step S212, in step S214, upon receipt of the private key 313 and the certificate reference 32 from the authentication server 4, through the executed authentication application 22, the client device 2 generates the PIN code through an input operation of the user input interface by the end user 5, and encrypts the private key 313 with the PIN code generated thereby to generate the reference private key 23. Finally, the client device 2 stores the reference private key 23 and the certificate reference 32 in the storage unit. Accordingly, the registration procedure associated with the end user 5 is completed.

Referring to FIGS. 1, 3a, 3b and 3c, the system 100 is configured to implement a procedure of an electronic transaction between the end user 5 and the network server 1 in accordance with the network authentication method of the embodiment. The procedure of the electronic transaction illustrates identity verification, signature verification and data verification, and includes the following steps.

Figure 3A:
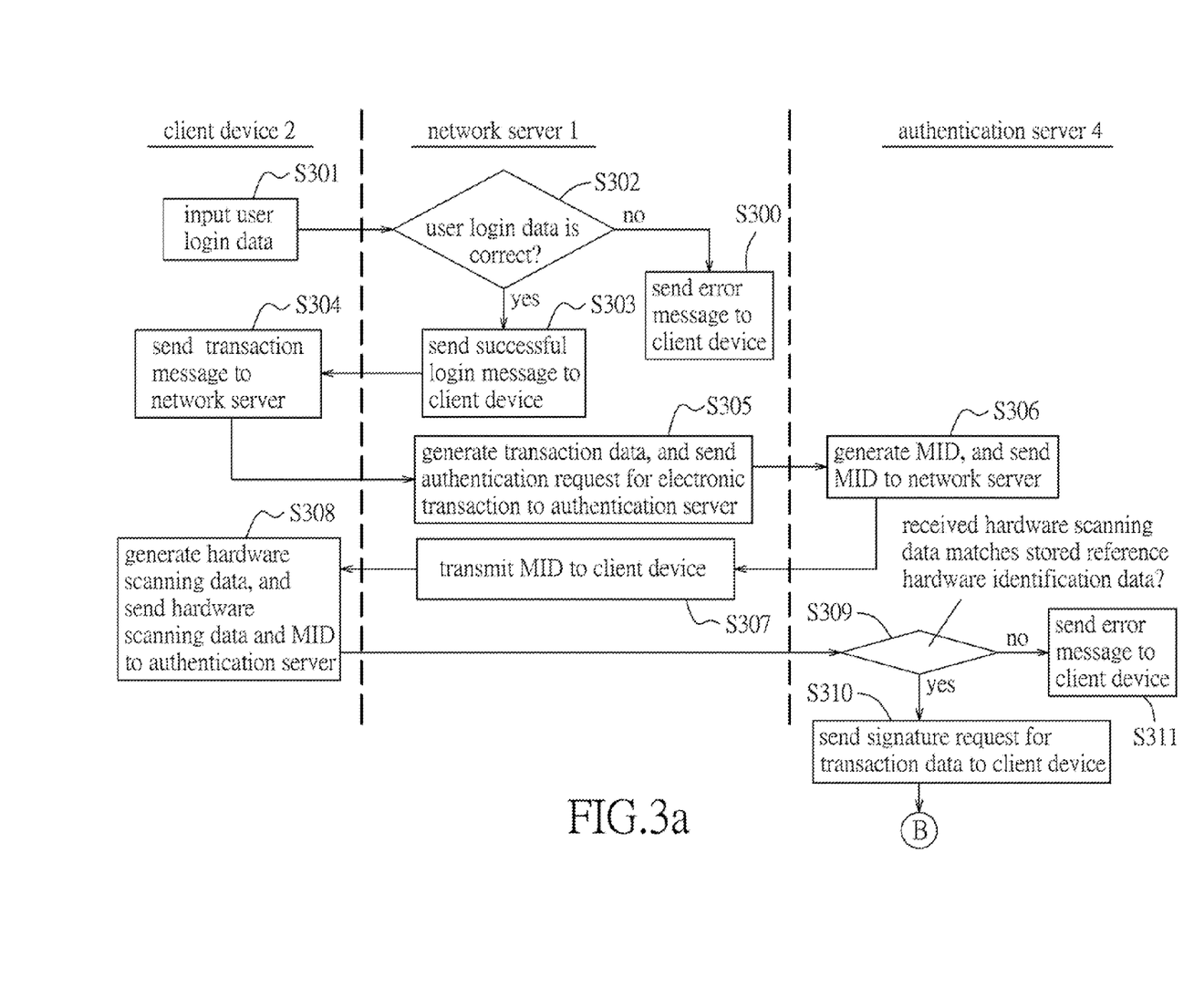
FIGS. 3a, 3b and 3c cooperatively illustrate a procedure of how an electronic transaction is conducted in the system of FIG. 1 according to the network authentication method of the embodiment.

In step S301, upon execution of the service application 21 on the client device 2, the end user 5 inputs user login data using the user input interface (not shown) of the client device 2 at a website provided by the network server 1. The user login data is then sent from the client device 2 to the network server 1 via the first communication channel 401. In this embodiment, the user login data includes the UID 311 of the end user 5, and the password.

In step S302, upon receipt of the user login data from the client device 2, the network server 1 determines whether the user login data thus received is correct. If the result is affirmative, the network server 1 sends a successful login message to the client device 2 via the first communication channel 401 (step S303). Otherwise, the network server 1 sends an error message to the client device 2 for displaying on the display unit of the client device 2 (step S300).

Following step S303, in step S304, through the executed service application 21, the client device 2 sends a transaction message associated with the electronic transaction to the network server 1 via the first communication channel 401.

In step S305, upon receipt of the transaction message from the client device 2, the network server 1 processes the transaction message thus received to generate transaction data that is to be confirmed and signed by the end user 5. Then, the network server 1 sends an authentication request for the electronic transaction to the authentication server 4 via the third communication channel 403. In this embodiment, the authentication request includes the UID 311 of the end user 5 and the transaction data.

In step S306, upon receipt of the authentication request from the network server 1, the authentication server 4 generates a one-time message identification (MID) that corresponds uniquely to the authentication request thus received, and sends the MID to the network server 1 via the third communication channel 403.

In step S307, the network server 1 transmits the MID from the authentication server 4 to the client device 2 via the first communication channel 401.

In step S308, the client device 2 executes, in response to receipt of the MID from the network server 1, the authentication application 22 to generate hardware scanning data that is associated with the identification codes of the hardware components of the client device 2 and to send the MID received thereby and the hardware scanning data generated thereby to the authentication server 4 via the fifth communication channel 405.

Figure 3B:
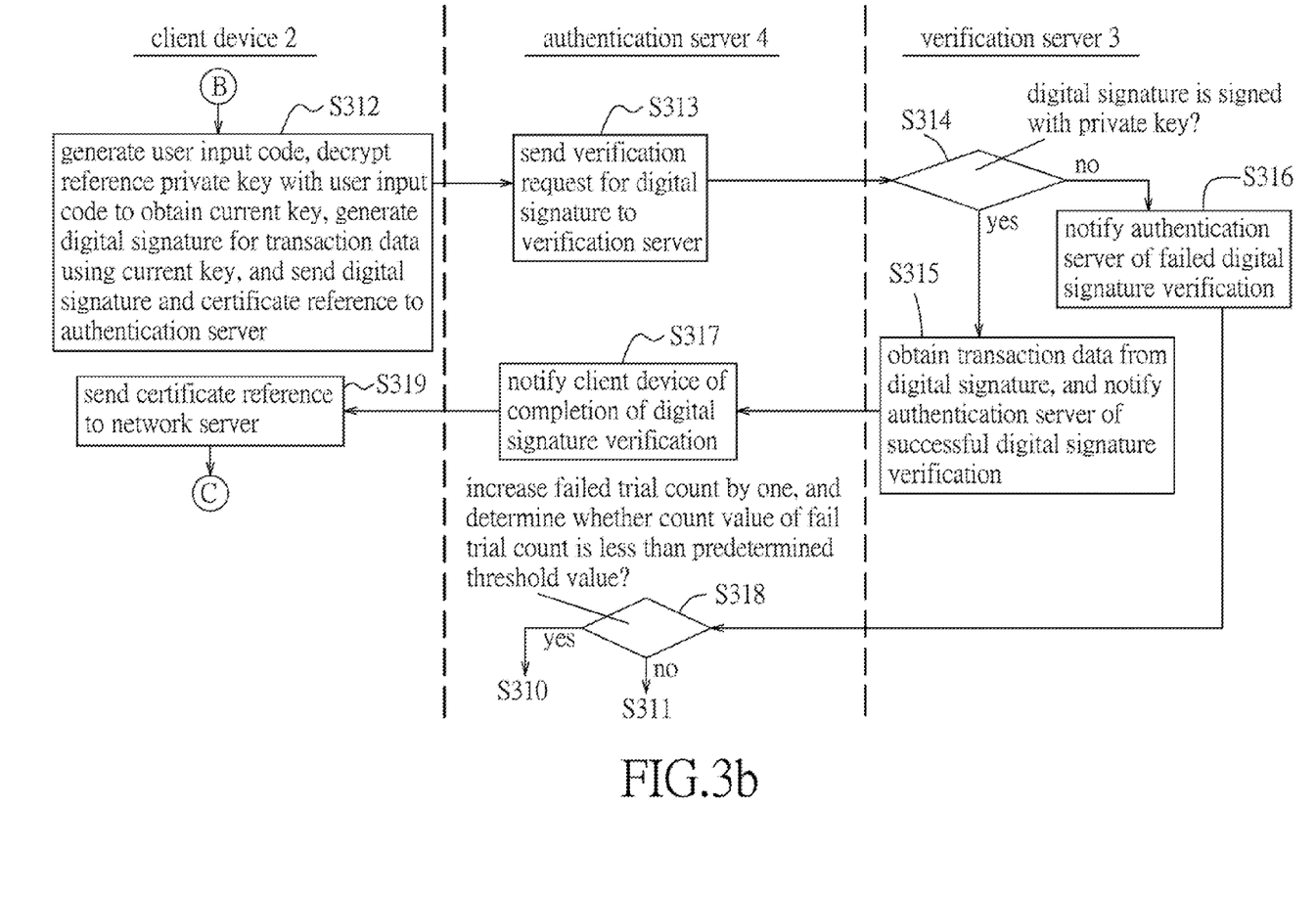

In step S309, upon receipt of the MID and the hardware scanning data from the client device 2, the authentication server 4 verifies whether the hardware scanning data received thereby matches the reference hardware identification data stored therein during the registration procedure (i.e., to verify the identity of the client device 2). If the result is affirmative (i.e., the identity of the client device 2 is successfully verified), the authentication server 4 sends a signature request for the transaction data to the client device 2 via the fifth communication channel 405 (step S310). The signature request includes the transaction data that is received by the authentication server 4 in step S306. Otherwise, the authentication server 4 sends an error message to the client device 2 for displaying on the display unit of the client device 2 (step S311).

Following step S310, in step S312, upon receipt of the signature request from the authentication server 4, the client device 2 first displays the transaction data on the display unit for viewing by the end user 5 so that the end user 5 is able to confirm the correctness of the transaction data displayed on the display unit of the client device 2. Subsequently, after confirmation, the client device 2, through the executed authentication application 22, generates a user input code through an input operation of the end user 5 using the user input interface, decrypts the reference private key 23 stored in the storage unit with the user input code to obtain a current key, and generates a digital signature for the transaction data using the current key and the transaction data. It is noted that, in this case, the reference private key 23 can be successfully decrypted using the user input code to obtain the private key 313, which is paired with the public key 312 included in the certificate 31, to serve as the current key when the user input code is identical to the PIN code. Then, the client device 2 sends, in response to the signature request, the certificate reference 32 stored therein, and the digital signature generated thereby and associated with the certificate reference 32, to the authentication server 4 via the fifth communication channel 405.

In step S313, upon receipt of a digital signature and a certificate reference 32 via the communication network 400, the authentication server 4 sends a verification request for the digital signature thus received to the verification server 3 via the fourth communication channel 404. In this embodiment, the verification request for the digital signature includes the digital signature and the certificate reference 32.

In step S314, in response to receipt of the verification request from the authentication server 4, the verification server 3 verifies, based on the public key of the certificate 31 to which the certificate reference 32 is uniquely mapped, whether or not the digital signature included in the verification request thus received is signed with the private key 313. If the result is affirmative (i.e., the user input code is identical to the PIN code), the verification server 3 successfully decrypts the digital signature with the public key 312 to thus obtain from the decrypted digital signature the transaction data that is determined to be associated with the end user 5 and that has been confirmed by the end user 5, and notifies the authentication server 4 of successful digital signature verification (step 315). Otherwise, the verification server 3 notifies the authentication server 4 of failed digital signature verification (step 316).

Following step S315, in step S317, upon receipt of the notification of successful digital signature verification from the verification server 3, the authentication server 4 notifies the client device 2 of completion of digital signature verification.

Following step S316, in step S318, upon receipt of the notification of failed digital signature verification from the verification server 3, the authentication server 4 increases a failure trial count of a failure counter (not shown) associated with the authentication request for the electronic transaction by one, and determines whether the count value of the failure trial count is less than a predetermined threshold value, which is, for example, equal to 3. If the result is affirmative, the flow goes back to step S310 to permit the end user 5 to enter again another user input code for generation of another digital signature. In this case, the signature request for the transaction data sent by the authentication server 4 in step S310 further includes notification of PIN error. Otherwise, the flow goes back to step S311.

Figure 3C:
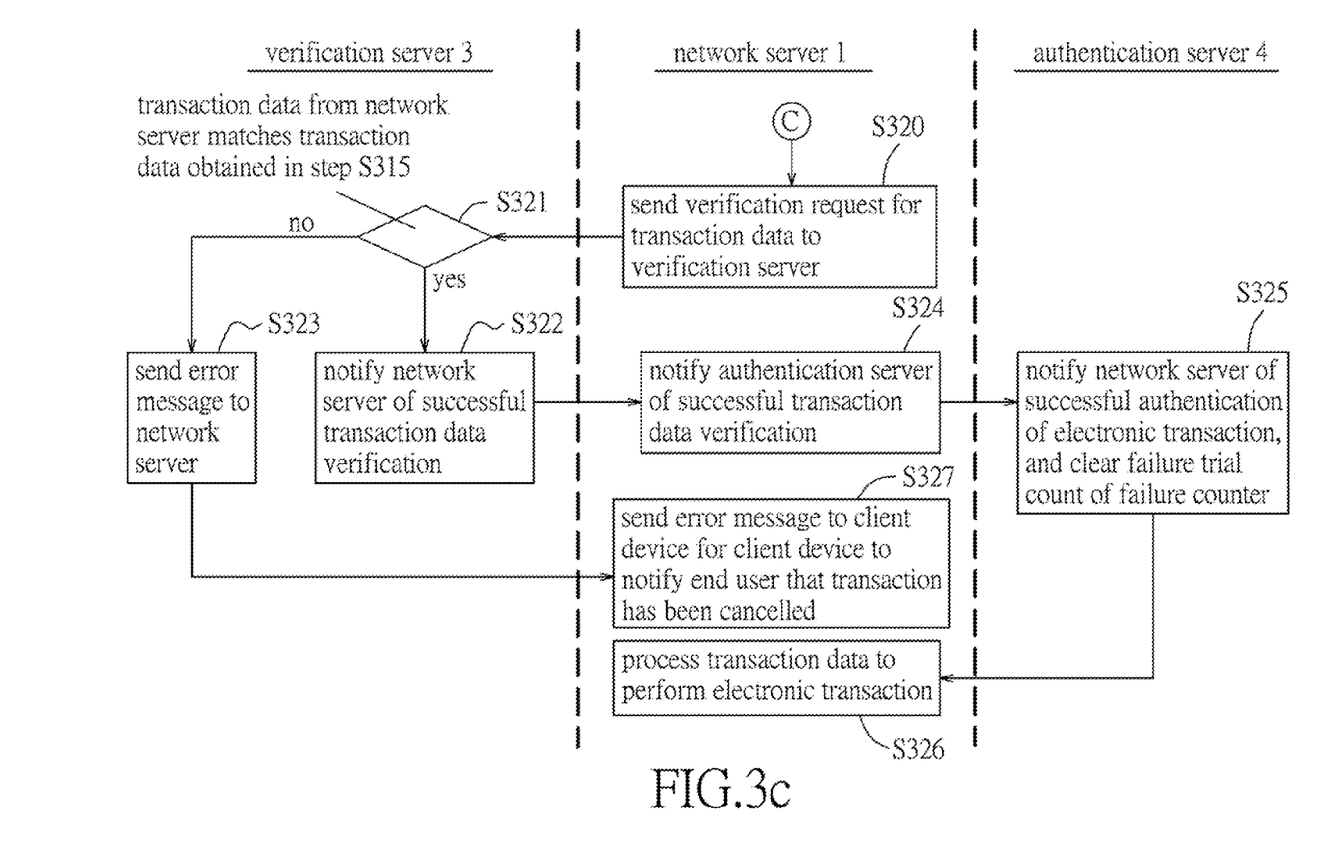

Following step S317, in step S315, upon receipt of the notification of completion of digital signature verification from the authentication server 4, the client device 2 sends, through the executed service application 21, the certificate reference 32 stored therein to the network server 1 via the first communication channel 401.

In step S320, upon receipt of a certificate reference 32 via the communication network 400, the network server 1 sends a verification request for the transaction data to the verification server 3 via the second communication channel 402. In this embodiment, the verification request includes the transaction data and the certificate reference 32 thus received.

In step S321, in response to receipt of the verification request from the network server 1, the verification server 3 determines whether the transaction data from the network server 1 matches the transaction data obtained thereby in step S315 and actually confirmed by the end user 5. If the result is affirmative (i.e., it is confirmed that during transmission from the client device 2 to the network server 1, the transaction message has not been tampered with), the verification server 3 notifies the network server 1 of successful transaction data verification (step S322). Otherwise, the verification server 3 sends an error message to the network server 1 (step S323). Upon receipt of the error message by the network server 1, the network server 1 sends an error message to the client device 2, which then notifies the end user 5 that the transaction has been cancelled (step S327).

Following step S322, in step S324, in response to receipt of the notification of successful transaction data verification from the verification server 3, the network server 1 notifies the authentication server 4 of successful transaction data verification.

In step S325, upon receipt of the notification of successful transaction data verification from the network server 1, the authentication server 4 notifies the network server 1 of successful authentication of the electronic transaction, and clears the failure trial count of the failure counter. Finally, upon receipt of notification of successful authentication of the electronic transaction from the authentication server 4, the network server 1 processes the transaction data generated in step S305 to perform the electronic transaction (step S326).

The following are some of the advantages attributed to the network authentication method of the present invention:

1. The client device 2 stores the reference private key 23 instead of the private key 313 while the private key 313 can be obtained by decrypting the reference private key 23 only with the correct user input code that is identical to the PIN code entered by the end user 5. In use, the user is given a very short period of time to enter the PIN code known only by the end user 5 and the entered PIN code is only temporarily stored. In this case, since the PIN code is not permanently stored in any component in the system 100, a copy/clone of the client device 2 or off-line attack by an attacker is limited to guessing the PIN code without any means to know whether the PIN code has been found. In addition, an upper limit of the predetermined threshold value is imposed on the number of available trials for inputting the user input code (i.e., the count value of the failure trial count of the failure counter), thereby ensuring effective electronic signature as the attacker can hardly obtain the private key 313 and/or the PIN code from the client device 2.

2. Only the certificate reference 32, instead of the complete certificate 31, is transmitted within the communication network 400. In other words, the public key 312 of the certificate 31 is not outputted by the verification server 3 and is not transported within the communication network 400. Therefore, the attacker cannot steal the certificate 31 stored in the verification server 3 via the communication network 400, thereby ensuring effective digital signature authentication.

3. After successful digital signature authentication, the transaction data of the electronic transaction obtained by the network server 1 is further verified by the verification server 3, thereby effectively preventing the transaction message (transaction data) from being tampered with during transmission from the client device 2 to the network server 1.

4. In addition to the service application 21, the authentication application 22 is stored in the client device 2 and is executed to generate hardware scanning data associated with the hardware components of the client device 2 for subsequent use in authenticating the identity of the client device 2.

In sum, due to the above advantages, the network authentication method of this invention can secure electronic transactions without the need for the additional identity verification device(s) in the prior art.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A network authentication method to be implemented using a client device and a verification server that are connected to a communication network, the client device being associated with an end user and storing an authentication application, said network authentication method comprising the steps of:
   a) storing, by the verification server, a certificate that is assigned to the end user, the certificate including a unique user identifier (UID) of the end user, and an asymmetric key pair of a public key and a private key;
   (b) upon receipt of the private key of the asymmetric key pair and a certificate reference, which is mapped uniquely to the certificate assigned to the end user, that are associated with an authentication registration request from a network server, storing, by the client device, the certificate reference and a reference private key that is obtained by encrypting the private key with a personal identification number (PIN) code that is determined by the end user;
   (c) generating an input code through an input operation by the client device to decrypt the reference private key stored in step b) with the user input code to obtain a current key, after receipt of a signature request and transaction data, from the authentication server in response to an authentication request received from the network server, wherein the transaction data is associated with an electronic transaction message between the client device and the network server and that is to be confirmed by the end user, and in response to execution of the authentication application, generating a digital signature for the transaction data using the current key and the transaction data; and
   (d) determining by the verification server, upon receipt a verification request including the digital signature and the certificate reference from the authentication server, based on the public key of the certificate to which the certificate reference received thereby is uniquely mapped, whether or not the digital signature received thereby is signed with the private key, and obtaining from the digital signature received thereby the transaction data that has been determined to be associated with the end user and that has been confirmed by the end user when it is determined that the digital signature is signed with the private key.

2. The network authentication method as claimed in claim 1, wherein, in step c), when the user input code is identical to the PIN code, the current key is identical to the private key.

3. The network authentication method as claimed in claim 1, to be implemented further using the network server and an authentication server that are connected to the communication network, said network authentication method further comprising, between steps b) and c), the steps of:

e) upon receipt of a transaction message associated with the electronic transaction, sending, by the network server, an authentication request for the electronic transaction to the authentication server via the communication network, the authentication request including the UID of the end user and the transaction data to be confirmed by the end user; and f) after receipt of the authentication request from the network server, sending, by the authentication server, a signature request for the transaction data to the client device via the communication network, the signature request including the transaction data;

wherein, in step c), prior to generation of the user input code, the client device further displays the transaction data thereon.

4. The network authentication method as claimed in claim 3, further comprising, between steps c) and d), the steps of:

g) by the client device, sending, in response to execution of the authentication application, the digital signature generated in step c) and the certificate reference stored in step b) to the authentication server via the communication network; and h) upon receipt of a digital signature and a certificate reference via the communication network, sending, by the authentication server, a verification request for the digital signature to the verification server via the communication network, the verification request including the digital signature and the certificate reference received by the authentication server;

wherein step d) is performed by the verification server upon receipt of the verification request.

5. The network authentication method as claimed in claim 4, further comprising, subsequent to step d), the steps of:

i) when it is determined that the digital signature is signed with the private key, notifying, by the verification server, the authentication server of successful digital signature verification;

j) upon receipt of the notification of successful digital signature verification from the verification server, notifying, by the authentication server, the client device of completion of digital signature verification;

k) upon receipt of the notification of completion of digital signature verification from the authentication server, sending, by the client device, the certificate reference stored in step b) to the network server via the communication, network;

l) upon receipt of a certificate reference via the communication network, sending, by the network server, a verification request for the transaction data to the verification server via the communication network, the verification request including the transaction data and the certificate reference received by the network server; and m) in response to receipt of the verification request from the network server, by the verification server, determining whether or not the transaction data included in the verification request matches the transaction data obtained thereby in step d) and confirmed by the end user, and notifying the network server of successful transaction data verification when it is determined that the transaction data included in the verification request matches the transaction data obtained thereby in step d);

n) upon receipt of the notification of successful transaction data verification from the verification server, notifying, by the network server, the authentication server of successful transaction data verification;

o) upon receipt of the notification of successful transaction data verification, notifying, by the authentication server, the network server of successful authentication of the electronic transaction.

6. The network authentication method as claimed in claim 3, the client device including a plurality of hardware components, each of which has a unique identification code, the authentication server storing reference hardware identification data that is associated with the UID of the end user and that is used to verify the identity of the client device, said network authentication method further comprising, between steps e) and f), the steps of:

p) in response to receipt of the authentication request from the network server, by the authentication server, generating a one-time message identification (MID) that corresponds uniquely to the authentication request, and sending the MID to the network server via the communication network;

q) transmitting, by the network server, the MID from the authentication server to the client device via the communication network;

r) in response to receipt of the MID from the network server, by the client device, executing the authentication application to generate hardware scanning data that is associated with the identification codes of the hardware components of the client device and to send the MID received thereby and the hardware scanning data generated thereby to the authentication server via the communication network; and s) upon receipt of the MID and the hardware scanning data via the communication network, by the authentication server, determining whether or not the hardware scanning data received thereby matches the reference hardware identification data stored therein;

wherein step f) is performed when it is determined that the hardware scanning data received by the authentication server in step s) matches the reference hardware identification data stored in the authentication server.

7. The network authentication method as claimed in claim 1, further comprising, prior to step a), the step of:

I) in response to receipt of a certificate request for the end user that includes the UID of the end user, by the verification server, assigning the certificate to the end user, and generating the certificate reference that is mapped uniquely to the certificate and that is to be stored in the client device in step b).

8. The network authentication method as claimed in claim 7, to be implemented further using an authentication server connected to the communication network, said network authentication method further comprising, between steps a) and b), the steps of:

II) receiving, by the authentication server, an authentication registration request for the end user, the authentication registration request including the UID of the end user, the private key, and the certificate reference generated by the verification server in step I);

III) sending, by the authentication server, the private key and the certificate reference received thereby to the client device via the communication network; and IV) upon receipt of the private key and the certificate reference from the authentication server, by the client device, in response to execution of the authentication application, generating the PIN code through an input operation by the end user, and encrypting the private key with the PIN code to generate the reference private key.

9. The network authentication method as claimed in claim 8, to be implemented further using the network server, the network server being connected to the communication network, said network authentication method further comprising, prior to step I), the step of:

V) after successful login, sending, by the network server, the certificate request to the verification server via the communication network.

10. The network authentication method as claimed in claim 9, further comprising, between steps a) and II), the steps of:

VI) in response to receipt of the certificate request from the network server, sending, by the verification server, the private key and the certificate reference to the network server via the communication network; and VII) upon receipt of the private key and the certificate reference from the verification server, sending, by the network server, the authentication registration request to the authentication server via the communication network.

11. The network authentication method as claimed in claim 9, the client device including a plurality of hardware components, each of which has a unique identification code, said network authentication method further comprising, between steps II) and III), the steps of:

VIII) in response to receipt of the authentication registration request, by the authentication server, generating an authentication code, and sending the authentication code to the network server via the communication network;

IX) upon receipt of the authentication code from the authentication server, sending, by the network server, the authentication code to the client device;

X) in response to receipt of the authentication code from the network server, by the client device, executing the authentication application to generate hardware scanning data that is associated with the identification codes of the hardware components of the client device and to send the authentication code received thereby and the hardware scanning data generated thereby to the authentication server via the communication network; and XI) upon receipt of hardware scanning data and authentication code via the communication network, by the authentication server, determining whether or not the authentication code received thereby matches the authentication code generated in step VIII), and storing, when it is determined that a match occurs, the hardware scanning data received thereby as reference hardware identification data that is associated with the UID of the end user and that is used to verify the identity of the client device;

wherein step III) is performed when the authentication code received by the authentication server in step X) is identical to the authentication code generated by the authentication server in step VIII).

\* \* \* \* \*